United States Patent Office 3,437,690
Patented Apr. 8, 1969

3,437,690
VAPOR PHASE PROCESS FOR PREPARING UNSATURATED ALIPHATIC ALDEHYDES AND MONOCARBOXYLIC ACIDS
Howard S. Young and Edgar L. McDaniel, Kingsport, Tenn., assignors to Eastman Kodak Company, Rochester, N.Y., a corporation of New Jersey
No Drawing. Continuation of application Ser. No. 375,305, June 15, 1964. This application Nov. 21, 1967, Ser. No. 684,874
Int. Cl. C07c 51/20, 45/04
U.S. Cl. 260—533
20 Claims

ABSTRACT OF THE DISCLOSURE

Process for preparing acrolein and acrylic acid comprising reacting in the vapor phase propylene and oxygen in the presence of a catalyst comprising a calcined mixture of an oxide of arsenic, a molybdochromic heteropoly acid and a carrier. The catalyst may optionally include an oxide of chromium, an oxide of manganese, an oxide of iron, or an oxide of boron.

---

This is a continuation of Ser. No. 375,305, filed June 15, 1964, now abandoned.

This invention relates to a process for preparing unsaturated aliphatic aldehydes and monocarboxylic acids and to novel catalyst compositions useful in the process of the invention. The novel catalyst compositions disclosed herein are described and claimed in our copending U.S. application Ser. No. 574,836 filed Apr. 26, 1966. More particularly it relates to a vapor phase process for the production of acrolein, methacrolein, acrylic acid and methacrylic acid by oxidizing propylene or isobutylene or isobutylene with oxygen in the presence of our novel catalyst comprising a mixture of an oxide of arsenic alone, or together with an oxide of chromium, manganese, iron or boron, and a heteropoly acid of molybdenum containing chromium as the central atom on a carrier.

Unsaturated aliphatic aldehydes and acids have utility in a wide variety of commercial applications. While a number of catalytic processes involving air oxidation of propylene or isobutylene, in the presence of certain metallic oxide catalysts, have been proposed for the preparation of acrolein and methacrolein, respectively, most of these processes have not proven entirely satisfactory for commercial applications primarily because of the difficulty of maintaining the catalysts in a selectively active condition over long periods of reaction time. This requirement of long-life catalysts is recognized as being particularly necessary for continuous manner of operations.

We have now found that by passing a mixture of propylene and oxygen, in certain proportions, at elevated temperatures and in the vapor phase, over a catalyst comprising a mixture of an oxide of arsenic alone or together with an oxide of chromium, manganese, iron or boron and a heteropoly acid of molybdenum containing chromium as the central atom, or salts of said heteropoly acids, on a carrier, the reaction goes smoothly and results in relatively high conversions to acrolein and organic acids comprising acrylic acid as the major acid component. Acetic acid is also produced. When isobutylene is employed instead of propylene the reaction also goes smoothly and methacrolein, methacrylic acid and acetic acid are obtained along with traces of acrolein and acrylic acid. The reaction products can be readily recovered from the effluent stream from the reactor by conventional separation means, e.g. by fractional distillation of the effluent condensate.

The novel catalyst compositions used in carrying out the process of the invention retain their activity and selectivity over relatively long-life periods without appreciable physical deterioration, thereby providing an efficacious vapor phase catalytic process for the production of acrolein and acrylic acid from propylene and oxygen, and of methacrolein and methacrylic acid from isobutylene and oxygen. The novel catalyst compositions are especially well adapted for continuous modes of operation as, for example, in a fluidized bed type of reactor.

It is, accordingly, an object of the invention to provide a novel process for the preparation of unsaturated aliphatic aldehydes and monocarboxylic acids from propylene and oxygen or isobutylene and oxygen.

Another object is to provide a novel vapor phase process for converting a mixture of propylene and oxygen to acrolein. Another object is to carry out the conversion to acrolein in a continuous process.

Still another object is to provide a novel vapor phase process for converting a mixture of propylene and oxygen to acrylic acid. Another object is to carry out the conversion to acrylic acid in a continuous manner.

Another object of the invention is to provide a novel process for the preparation of methacrolein.

A further object of the invention is to provide a novel process for the preparation of methacrylic acid.

Another object is to provide novel catalyst compositions.

Other objects will become apparent from the general description and examples hereinafter.

In accordance with the process of our invention, we prepare unsaturated aliphatic aldehydes and monocarboxylic acids by passing a feed mixture comprising propylene or isobutylene and molecular oxygen, in vapor phase at elevated temperatures, over a catalyst comprising a mixture of (1) a heteropoly acid of molybdenum containing chromium as the central atom and (2) an oxide of arsenic alone or together with an oxide of chromium, manganese, iron or boron such as chromic oxide, manganic oxide, ferric oxide or boric oxide on a carrier. Process-wise the present invention is particularly concerned with the process for converting propylene to acrolein and acrylic acid.

As shown hereinafter, the mole ratios of the olefin and oxygen reactants can be varied over a relatively wide range. To minimize the possibility of an explosion water vapor can be included in the feed mixture. It may be added in amounts up to 5 moles of water per mole of the olefin (propylene or isobutylene). Inert gaseous diluents other than water vapor, such as nitrogen, carbon dioxide, argon, helium, neon, or the like, can be included in the feed mixture to minimize the possibility of an explosion. The mole ratio of the olefin to oxygen can range from 1:0.2 to 1:10, preferably from 1:0.3 to 1:8. Contact times of from 0.05 to 30 seconds can be used, but contact times of from 0.5 to 10 seconds are preferred. The oxygen can be fed as air or as a mixture with the inert gaseous diluents just named. The temperature of the reaction can be varied from about 300° C. to about 600° C., but preferably ranges from 350° C.–550° C. The reaction is not significantly pressure dependent. Pressures of slightly under 1 atmosphere to about 5 atmospheres are preferred, although other pressures can be used. The gaseous hourly space velocity may be varied over a wide range, for example, values from about 100 to about 6000, but preferably from 200–1000. The reaction can be carried out in fixed or fluidized catalyst beds. However, since the reaction is highly exothermic, it is of some advantage to use a fluidized catalyst bed wherein the catalyst exists as small particles which are suspended in an upflowing stream of feed gas. If desired, the acrolein may be recycled through the system to increase the yield of acrylic acid.

In preparing the novel catalyst compositions employed by us in carrying out the process of the invention, an essentially intimate mixture of a heteropoly acid of molybdenum containing chromium as the central atom such as, for example, hexamolybdochromic acid having the empirical formula $H_3CrMo_6O_{21}$, a carrier and an oxide of arsenic such as arsenic pentoxide ($As_2O_5$) or arsenic trioxide ($As_2O_3$) or mixtures thereof, is prepared and calcined. The calcination can be carried out, for example, by heating the catalyst mixture at a temperature of from about 200° C. to about 600° C. for a period of several hours or more. The calcined mixture is then reduced to operable granules or particles. Preferably the calcining operation is carried out in the presence of air or other suitable oxygen-containing gaseous mixture. However, it can be conducted in the absence of oxygen.

The heteropoly acid or its ammonium salt can be used in the preparation of the catalyst. Presumably, the latter decomposes wholly, or in part, to ammonia and the acid under calcination or during use at reaction temperatures. The concentration of the heteropoly acid of molybdenum containing chromium can vary from about 5 to about 60% (preferably 30 to 50%) by weight of the catalyst. The concentration of the oxide of arsenic, calculated as $As_2O_5$, can vary from about 1% to about 20% (preferably 2 to 9%) by weight of the catalyst. The concentration of the oxide of chromium, manganese or iron can vary from about 0.1 to about 25% (preferably 2 to 10%) by weight of the catalyst. The concentration of the oxide of boron can vary from about 0.1 to about 5% (preferably 0.5 to 2%) calculated as boric oxide, by weight of the catalyst. The heteropoly acid is always present in a greater percent by weight than the oxide of arsenic or the oxide of chromium, manganese, iron or boron. The carrier can comprise about 30 to 94% by weight of the total catalyst composition. The most outstanding results in accordance with the invention are obtained with catalysts comprising 40 to 70% by weight of carrier. The heteropoly acid and the metallic oxides just named are supported on a carrier because it is advantageous to support them on a carrier. The percentages just given are for calcined carrier-supported catalysts. Thus the weight of the catalyst includes the weight of the carrier.

It may be that there is compound formation between the oxide of arsenic and the oxide of chromium, manganese, iron or boron. The chromium, manganese, iron or boron components can be added directly as oxides or in the form of any other compounds, for example, salts such as the nitrates, sulfates, etc. which decompose to the oxides on heating. Compounds of boron such as borates, metaborates and pyroborates can also be used as promoters.

Carriers that can be employed include, for example, silica, silica-alumina, kieselguhr, pumice, titania, zirconia, clay, etc., The use of silica as a carrier is preferred. The term silica includes silica gel, for example. The catalyst compositions can be readily regenerated by treatment with air or a gas containing molecular oxygen at or above the reaction temperatures. While the arsenic-promoted molybdenum heteropoly acid catalysts of the invention are active and selective for the synthesis described herein, the addition of the chromium, manganese or iron component improves the physical strength and the activity of the catalyst. The addition of the boron component improves the activity of the catalyst. It is possible, that when an oxide of arsenic promoter is used in conjunction with an oxide of chromium, manganese or iron, metal arsenates are formed. Physical strength is important in any solid catalyst, and especially in the case of those to be used in a fluidized state where the catalyst must be strong enough to resist attrition.

In practicing the invention, any of the conventional types of apparatus suitable for carrying out the process of the invention in the vapor phase can be employed including, for example, a tubular type of fluidized or fixed bed reactor or furnace which is equipped to contain the catalyst in intimate contact with the entering feed gases. The effluent gases are then conducted to suitable condensing and separatory equipment for recovering the aliphatic aldehyde and carboxylic acid products. Advantageously, the reaction is periodically interrupted to regenerate the catalyst by feeding into the reactor a stream of air or gases containing molecular oxygen and noncombustibles at or above reaction temperature. The catalyst can be regenerated, for example, by fluidizing with air at a temperature of 430° C. for 30 minutes.

The fluidized bed reactor employed by us in carrying out the process of the examples consisted of an upright cylindrical tube of Vycor glass of 15 inches length. The lower portion of the tube has an internal diameter of 40 mm. and terminates in a conical bottom which is about 1 inch in length. The lower portion of the tube including the conical bottom is 25 cm. in length. The upper portion of the cylindrical reactor tube has an internal diameter of 55 mm. throughout the greater portion of its length and is tapered at its ends, i.e. where it forms the top end of the cylindrical reactor tube and where it joins the portion of the reactor tube which has an internal diameter of 40 mm. The feed gases are directed into the bottom of the reactor serving thereby to fluidize the catalyst composition. This was done by introducing the feed gases through a feed tube inserted through the opening at the top of the reactor and extending to the bottom of the catalyst material or by supporting the catalyst on a porous quartz plate located at the top of the conical portion of the reactor and introducing the feed gases through the opening in the bottom of the conical portion. The reactor was heated electrically. Any suitable method of heating the reactor can be employed.

The definitions of certain terms used in the examples are as follows:

Contact time is the average time in seconds which the reactants spend at reaction conditions in a volume equal to that of the catalyst bed.

The percent conversion of propylene to acrolein =

$$\frac{\text{moles of acrolein formed}}{\text{moles of propylene fed}} \times 100$$

The percent yield of acrolein =

$$\frac{\text{moles of acrolein formed}}{\text{moles of propylene consumed}} \times 100$$

The percent conversion of propylene to organic acids =

$$\frac{\text{moles of organic acids formed}}{\text{moles of propylene fed}} \times 100$$

Gaseous hourly space velocity (GHSV) is defined as the number of volumes of feed gases at standard temperature and pressure (STP) which pass through one volume of catalyst bed in one hour.

This invention is further illustrated by the following examples of preferred embodiments thereof although it will be understood that these examples are included primarily for purposes of illustration and are not intended to limit the scope of the invention unless otherwise specifically indicated:

Example 1

A catalyst comprising 4.7% arsenic pentoxide, 39.8% hexamolybdochromic acid, and silica was prepared as follows. To 840 g. of silica sol (30% silica) were added 222 g. of pulverized ammonium hexamoylbdochromiate. The slurry was stirred and heated, and a solution of 21.4 g. arsenic oxide in 100 ml. of water was added. The slurry was heated until it set to a gel; after drying at 120° C., it was calcined at 200° C. for four hours. The catalyst thus obtained was crushed, sieved, and 200 ml. of 40 x 120 mesh material were changed to the reactor.

A feed stream consisting of 286 ml. of propylene, 286 ml. of nitrogen, and 1430 ml. of air per minute, STP, was fed to the reactor. The reaction temperature was 485° C. and the contact time was 2.3 seconds. Over 30 minutes of reaction, 1.7 g. of acrolein were obtained. The conversion to acrolein was 7.8% and the yield was 24.7%. Some acrylic acid was also obtained.

Example 2

A catalyst comprising 5% arsenic pentoxide and 45% hexamolybdochromic acid was prepared as follows. To 667 g. of ammonia-stabilized 30% silica sol was added 222.4 g. of ammonium hexamolybdochromiate decahydrate crystals which had been pulverized. The slurry was stirred, heated, and then a solution of 20.3 g. of arsenic pentoxide in 100 ml. of water was added. After a few minutes of additional heating and stirring the sol set to a gel. It was dried in an oven at 125° C., and calcined for 7 hours at 250° C. and then for 1.25 hours at 450° C. The catalyst thus obtained was crushed, sieved, and 150 ml. of 80 x 200 mesh catalyst were charged to the reactor.

A feed stream consisting of 152 ml. of propylene and 925 ml. of air per minute, STP, was fed to the reactor. The reaction temperature was 430° C. and the contact time was 2.2 seconds. Over 23 minutes of reaction, 2.07 g. of acrolein were recovered. The conversion to acrolein was 16.2% and the yield was 32.3%. The conversion to organic acids was 11.1%, consisting mainly of acrylic acid.

Example 3

The catalyst used in Example 2 was regenerated by fluidizing with air for 30 minutes at 430° C and tested as follows. A feed stream consisting of 126 ml. of propylene, 186 ml. of water vapor, and 765 ml. of air per minute, STP, was fed to the reactor. The reaction temperature was 428° C. and the contact time was 2.2 seconds. Over 40 minutes of reaction, 2.07 g. of acrolein were recovered, corresponding to a conversion to acrolein of 16.4% and a 27.7% yield. The conversion to organic acids was 12.0%, consisting mainly of acrylic acid.

Example 4

The catalyst used in Example 3 was regenerated by fluidizing with air for 30 minutes at 430° C. and tested as follows. A feed stream consisting of 196 ml. of propylene and 1160 ml. of air per minute, STP, was fed to the reactor. The reaction temperature was 404° C. and the contact time was 1.78 seconds. Over 22 minutes of reaction, 1.63 g. of acrolein were recovered, corresponding to a conversion to acrolein of 15.1% and a 45.2% yield. The conversion to organic acids was 13.8%, consisting mainly of acrylic acid.

Example 5

A catalyst comprising by weight 4.0% chromic oxide, 6.1% arsenic pentoxide, 30% hexamolybdochromic acid and 59.9% silica was prepared in the same manner as that used for the catalyst of Example 2, with appropriate changes in the quantities of reagents taken. Chromium nitrate solution was added to the slurry at the time the arsenic oxide solution was added. The catalyst was calcined and 150 ml. of (80 x 200 mesh) the calcined catalyst were charged to the reactor.

A feed stream consisting of 152 ml. of propylene and 925 ml. of air per minute, STP, was fed to the reactor. The reaction temperature was 428° C. and the contact time was 2.2 seconds. Over 33 minutes of reaction, 0.65 g. of acrolein was recovered, corresponding to a conversion to acrolein of 5.2% and a 15.9% yield. The conversion to organic acids was 5.0%, consisting mainly of acrylic acid.

Example 6

The catalyst used in Example 5 was regenerated by fluidizing with air for 30 minutes at 430° C. and tested as follows. A feed stream consisting of 126 ml. of propylene, 186 ml. of water vapor, and 765 ml. of air per minute, STP, was fed to the reactor. The reaction temperature was 428° C. and the contact time was 2.2 seconds. Over 41 minutes of reaction, 0.43 g. of acrolein was recovered, corresponding to a conversion to acrolein of 3.4% and a 9.4% yield. The conversion to organic acids was 6.8%, consisting mainly of acrylic acid.

Example 7

The catalyst used in Example 6 was regenerated by fluidizing with air for 30 minutes at 430° C. and tested as follows. A feed stream consisting of 196 ml. of propylene and 1160 ml. of air per minute, STP, was fed to the reactor. The reaction temperature was 404° C. and the contact time was 1.78 seconds. Over 26 minutes of reaction, 0.55 g. of acrolein was recovered, corresponding to a conversion to acrolein of 4.4% and a 15.5% yield. The conversion to organic acids was 4.0%, consisting mainly of acrylic acid.

Example 8

The catalyst used in Example 7 was regenerated by fluidizing with air for 30 minutes at 430° C. and tested as follows. A feed stream consisting of 163 ml. of propylene, 489 ml. of water vapor and 914 ml. of air per minute, STP, was fed to the reactor. The reaction temperature was 500° C. and the contact time was 2.2 seconds. Over 25 minutes of reaction, 0.935 g. of acrolein was recovered, corresponding to a conversion to acrolein of 9.2% and a 16.9% yield. The conversion to organic acids was 2.9%, consisting mainly of acrylic acid.

The calcining operations described herein were carried out in the presence of air.

In place of the chromic oxide containing catalyst used in Example 5, there may be substituted generally similar catalyst compositions wherein the chromic oxide is replaced with an oxide of manganese such as for example, $Mn_2O_3$, an oxide of iron such as for example, $Fe_2O_3$, or an oxide of boron such as boric acid, for example.

Other catalyst compositions coming within the specified ranges of components of the invention can also be prepared in accordance with the procedures described hereinbefore. Thus calcined catalytic compositions containing by weight (a) 10% hexamolybdochromic acid, 2% arsenic pentoxide, 2% chromic oxide and 86% silica; (b) 25% hexamolybdochromic acid, 8% arsenic pentoxide, 6% chromic oxide and 61% silica; (c) 35% hexamolybdochromic acid, 13% arsenic pentoxide, 10% chromic oxide and 42% silica; (d) 45% hexamolybdochromic acid, 6% arsenic pentoxide, 15% chromic oxide and 34% silica; (e) 50% hexamolybdochromic acid, 4% arsenic pentoxide and 46% silica; (f) 60% hexamolybdochromic acid, 5% arsenic pentoxide and 35% silica; (g) 40% hexamolybdochromic acid, 5% arsenic pentoxide, 2% manganic oxide and 53% silica; (h) 45% hexamolybdochromic acid, 5% arsenic pentoxide, 10% manganic oxide and 40% silica; (i) 40% hexamolybdochromic acid, 5% arsenic pentoxide, 2% ferric oxide and 53% silica; (j) 35% hexamolybdochromic acid, 4% arsenic pentoxide, 10% ferric oxide and 51% silica; (k) 40% hexamolybdochromic acid, 5% arsenic pentoxide and 55% silica; (l) 30% hexamolybdochromic acid, 6% arsenic pentoxide and 64% silica; (m) 30% hexamolybdochromic acid, 2% arsenic pentoxide, 2% boric acid and 66% silica; (n) 40% hexamolybdochromic acid, 5% arsenic pentoxide, 0.5% boric acid and 54.5% silica; (o) 50% hexamolybdochromic acid, 9% arsenic pentoxide, 1% boric acid and 40% silica and (p) 25% hexamolybdochromic acid, 5% arsenic pentoxide, 2% boric acid and 68% silica, for example, can be prepared and used in the process of our invention. These catalysts likewise give relatively high conversions of propylene and oxygen to acrolein and organic acids comprising acrylic acid as the major acid component. When isobutylene is employed instead of propylene methacrolein, methacrylic acid and acetic acid are the principal products formed.

The invention has been described in detail with particular reference to preferred embodiments thereof, but it will be understood that variations and modifications can be effected within the spirit and scope of the invention as described hereinbefore and as defined in the appended claims.

We claim:
1. Process for preparing acrolein and acrylic acid comprising reacting in the vapor phase propylene with oxygen at a temperature of from about 300° C. to about 600° C. in the presence of a catalyst comprising a calcined mixture of (1) about 1% to about 20% by weight of an oxide of arsenic, calculated as $As_2O_5$; (2) about 5% to about 60% by weight of hexamolybdochromic acid; and (3) about 30% to about 94% by weight carrier; wherein (1) and (2) are supported on said carrier.

2. Process for preparing acrolein and acrylic acid as recited in claim 1 wherein said catalyst comprises a calcined mixture of (1) about 2% to about 9% by weight of an oxide of arsenic, calculated as $As_2O_5$; (2) about 30% to about 50% by weight of a hexamolybdochromic acid; and (3) about 40% to about 70% by weight carrier.

3. Process for preparing acrolein and acrylic acid as recited in claim 1 wherein the proportion of propylene to oxygen is in the mole ratio of from 1:0.2 to 1:10.

4. Process for preparing acrolein and acrylic acid as recited in claim 2 wherein the contact time is from 0.5 to 10 seconds.

5. Process for preparing acrolein and acrylic acid as recited in claim 2 wherein the reaction is carried out in the presence of an inert gaseous diluent.

6. Process for preparing acrolein and acrylic acid as recited in claim 2 wherein the oxygen is in the form of air.

7. Process for preparing acrolein and acrylic acid as recited in claim 2 wherein the catalyst is supported on silica.

8. Process for preparing acrolein and acrylic acid as recited in claim 2 wherein the oxide of arsenic is arsenic pentoxide.

9. Process for preparing acrolein and acrylic acid as recited in claim 2 wherein the proportion of propylene to oxygen is in the mole ratio of from 1:0.3 to 1:8.

10. Process for preparing acrolein and acrylic acid as recited in claim 1 wherein the catalyst contains a compound selected from the group consisting of an oxide of chromium, an oxide of manganese, an oxide of iron and an oxide of boron, said oxide of chromium, said oxide of manganese and said oxide of iron being present in amounts up to about 25% by weight and said oxide of boron being present in amounts up to about 5.0% by weight; said compound being supported on said carrier.

11. Process for preparing methacrolein and methacrylic acid comprising reacting isobutylene with oxygen in the vapor phase at a temperature of from about 300° C. to about 600° C. in the presence of a catalyst comprising a calcined mixture of (1) about 1% to about 20% by weight of an oxide of arsenic, calculated as $As_2O_5$; (2) about 5% to about 60% by weight of hexamolybdochromic acid; and (3) about 30% to about 94% by weight carrier; wherein (1) and (2) are supported on said carrier.

12. Process for preparing methacrolein and methacrylic acid as recited in claim 11 wherein said catalyst comprises a calcined mixture of (1) about 2% to about 9% by weight of an oxide of arsenic, calculated as $As_2O_5$; (2) about 30% to about 50% by weight of hexamolybdochromic acid; and (3) about 40% to about 70% by weight carrier.

13. Process for preparing methacrolein and methacrylic acid as recited in claim 12 wherein the proportion of isobutylene to oxygen is in the mole ratio of from 1:0.2 to 1:10.

14. Process for preparing methacrolein and methacrylic acid as recited in claim 12 wherein the contact time is from 0.5 to 10 seconds.

15. Process for preparing methacrolein and methacrylic acid as recited in claim 12 wherein the reaction is carried out in the presence of an inert gaseous diluent.

16. Process for preparing methacrolein and methacrylic acid as recited in claim 12 wherein the oxygen is in the form of air.

17. Process for preparing methacrolein and methacrylic acid as recited in claim 12 wherein the catalyst is supported on silica.

18. Process for preparing methacrolein and methacrylic acid as recited in claim 12 wherein the oxide of arsenic is arsenic pentoxide.

19. Process for preparing methacrolein and methacrylic acid as recited in claim 12 wherein the proportion of propylene to oxygen is in the mole ratio of from 1:0.3 to 1:8.

20. Process for preparing methacrolein and methacrylic acid as recited in claim 11 wherein the catalyst contains a compound selected from the group consisting of an oxide of chromium, an oxide of manganese, an oxide of iron and an oxide of boron, said oxide of chromium, said oxide of manganese and said oxide of iron being present in amounts up to about 25% by weight and said oxide of boron being present in amounts up to about 5.0 by weight; said compound being supported on said carrier.

References Cited

UNITED STATES PATENTS 3,177,257  4/1965  Detling et al. _____ 260—604

FOREIGN PATENTS 605,502  6/1961  Belgium.

LORRAINE A. WEINBERGER, *Primary Examiner.*

D. E. STENZEL, *Assistant Examiner.*

U.S. Cl. X.R.

252—456, 467, 432; 260—604